United States Patent [19]

Iwata

[11] Patent Number: 5,311,248
[45] Date of Patent: May 10, 1994

[54] COPYING AREA DISPLAY DEVICE FOR A COPIER

[75] Inventor: Atsuki Iwata, Tokyo, Japan
[73] Assignee: Ricoh Company, Ltd., Tokyo, Japan
[21] Appl. No.: 83,162
[22] Filed: Jun. 29, 1993

[30] Foreign Application Priority Data

Jun. 29, 1992 [JP] Japan .................................. 4-192822
Oct. 27, 1992 [JP] Japan .................................. 4-288318
May 6, 1993 [JP] Japan .................................. 5-105616

[51] Int. Cl.⁵ ............................................. G03B 27/62
[52] U.S. Cl. ........................................ 355/61; 355/75; 355/243; 355/311
[58] Field of Search .................. 355/61, 75, 243, 311

[56] References Cited

U.S. PATENT DOCUMENTS 4,577,960 3/1986 Zambelli ................................ 355/75
4,839,699 6/1989 Hosaka et al. .................. 355/243 X
4,939,553 7/1990 Sato et al. ............................ 355/311
5,241,346 8/1993 Ide et al. ............................. 355/311

Primary Examiner—Michael L. Gellner
Assistant Examiner—D. P. Malloy
Attorney, Agent, or Firm—Oblon, Spivak, McClelland, Maier & Neustadt

[57] ABSTRACT

A copying area display device for a copier and allowing the operator to easily position a document on a glass platen. The device displays an effective image reading area which is easy to see. When a cover plate is opened, a carriage included in a scanner is moved to one of four sides of the effective image reading area. Scales, lamps or movable marks are arranged around the glass platen and on the carriage. Alternatively, a liquid crystal display may be built in or superposed on the glass platen to display the contour of an effective image reading area. When the cover plate is closed, the scanner is returned to a home position thereof.

12 Claims, 15 Drawing Sheets

COPYING AREA DISPLAY DEVICE FOR A COPIER

BACKGROUND OF THE INVENTION

The present invention relates to a display device applicable to a copier for displaying a copying area.

It is a common practice with a copier to dispose a scanner below a glass platen. While the scanner scans the underside of a document laid on the glass platen, the resulting reflection from the document is incident on the surface of a photoconductive element or on an image sensor. A scale is located at each of two or four sides of the glass platen which the operator of the copier may reference in the event of positioning a document on the glass platen.

The maximum document size available with many of copiers for office use, for example, is A3. This kind of copier has a glass platen dimensioned slightly greater than A3 size. However, since documents of A3 size are rarely copied, compared to documents of the other sizes, only part of the glass platen is usually used as an area for reading a document image, i.e., an effective image reading area. Specifically, to copy a document of A4 size or similar size smaller than the glass platen, the operator has to set the document at a particular area matching the effective image reading area on the glass platen by hand. The above-mentioned scales help the operator so position the document on the glass platen. Specifically, the scales are each provided with graduations representative of regular sizes available with the copier, e.g., A3, B4, A4, B5 and A5. To reproduce a document of A4 size, for example, the operator has only to position the document at the graduation A4 of the scales.

In practice, however, positioning a document by referencing the scales is not easy. Particularly, assume a center registration type copier in which the effective image reading area is determined on the basis of the position of an axis passing the center of the short sides of the glass platen in parallel to the long sides. Then, even when a scale is arranged around all of the four sides of the glass platen, the actual effective image reading area adjoins only one scale and is spaced apart from the other three scales. Therefore, to position a document smaller in size than the glass platen at the effective image reading area, the operator has to determine the approximate position of the effective image reading area with the eye by looking at the three scales slightly spaced apart from the area for positioning the document and the single scale adjoining the area. This kind of scheme prevents the document from being accurately positioned and, in addition, forces the operator to take greatest care in positioning the document.

Moreover, when the operator adjusts a magnification to a desired value by using, for example, a zooming function, the effective image reading area differs from regular sizes. Hence, even with a corner registration type copier having a vertical and a horizontal scale contacting two adjoining sides of an effective image reading area, it is impossible for the operator to read the accurate position of the rectangle of the area on the scales. Therefore, the positioning operation on the glass platen is extremely difficult and time- and labor-consuming.

SUMMARY OF THE INVENTION

It is therefore an object of the present invention to provide a copying area display device for a copier which allows the operator to easily position a document on a glass platen.

In accordance with the present invention, in a copier of the type having a transparent glass platen on which a document is to be laid, an image reading unit disposed below the glass platen and physically movable along a first axis, an openable cover plate for covering the rear of a document laid on the glass platen when closed, a copying section for reproducing an image of the document read by the image reading unit, and an operating section accessible for entering at least a desired magnification, a copying area display device has a first scale located at, among four sides of the glass platen, a side perpendicular to the first axis and coincident with a reference position of an effective image reading area, and a second scale provided on a movable body of the image reading unit. The first and second scales extend parallel to a second axis perpendicular to said first axis. A sensor senses an open/closed position of the cover plate. A control unit determines, when the sensor senses an open position of the cover plate, a position of an effective image reading area on the basis of the size of a recording medium to be used and positions the movable body of the image reading unit such that the movable body coincides with one side of the effective image reading area.

Also, in accordance with the present invention, in a copier of the type described, a copying area display device has a plurality of display elements provided on at least either of, among four sides of the glass platen, a side perpendicular to the first axis and coincident with a reference position of an effective image reading area and a movable body of the image reading unit. The plurality of display elements are indicative of a position in a direction of a second axis perpendicular to the first axis. A sensor senses an open/closed position of the cover plate. A control unit determines, when the sensor senses an open position of the cover plate, a position of an effective image reading area on the basis of the size of a recording medium to be used, positions the movable body of the image reading unit such that the movable body coincides with one side of the effective image reading area, and controls the plurality of display elements to display the position of the effective image reading area. Further, in accordance with the present invention, in a copier of the type described, a copying area display device has movable marks provided on at least either of, among four sides of the glass platen, a side perpendicular to the first axis and coincident with a reference position of an effective image reading area and a movable body of the image reading unit and physically movable in a direction of a second axis perpendicular to the first axis. A drive mechanism drives the movable marks. A sensor senses an open/closed position of the cover plate. A control unit determines, when the sensor senses an open position of the cover plate, a position of an effective image reading area on the basis of the size of a recording medium to be used, positions the movable body of the image reading means such that the movable body coincides with one side of the effective image reading area, and causes the drive mechanism to move the movable marks to a position indicative of the effective image reading area.

Moreover, in accordance with the present invention, in a copier of the type having a transparent glass platen on which a document is to be laid, an openable cover plate for covering the rear of a document laid on the glass platen when closed, a copying section for reproducing an image of a document, and an operating section accessible for entering at least a desired magnification, a copying area display device has a liquid crystal display built in or superposed on the glass platen. A sensor senses an open/closed position of the cover plate. A control unit determines, when the sensor senses an open position of the cover plate, a position of an effective image reading area on the basis of a size of a recording medium to be used and causes the liquid crystal display to display the position of the effective image reading area.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
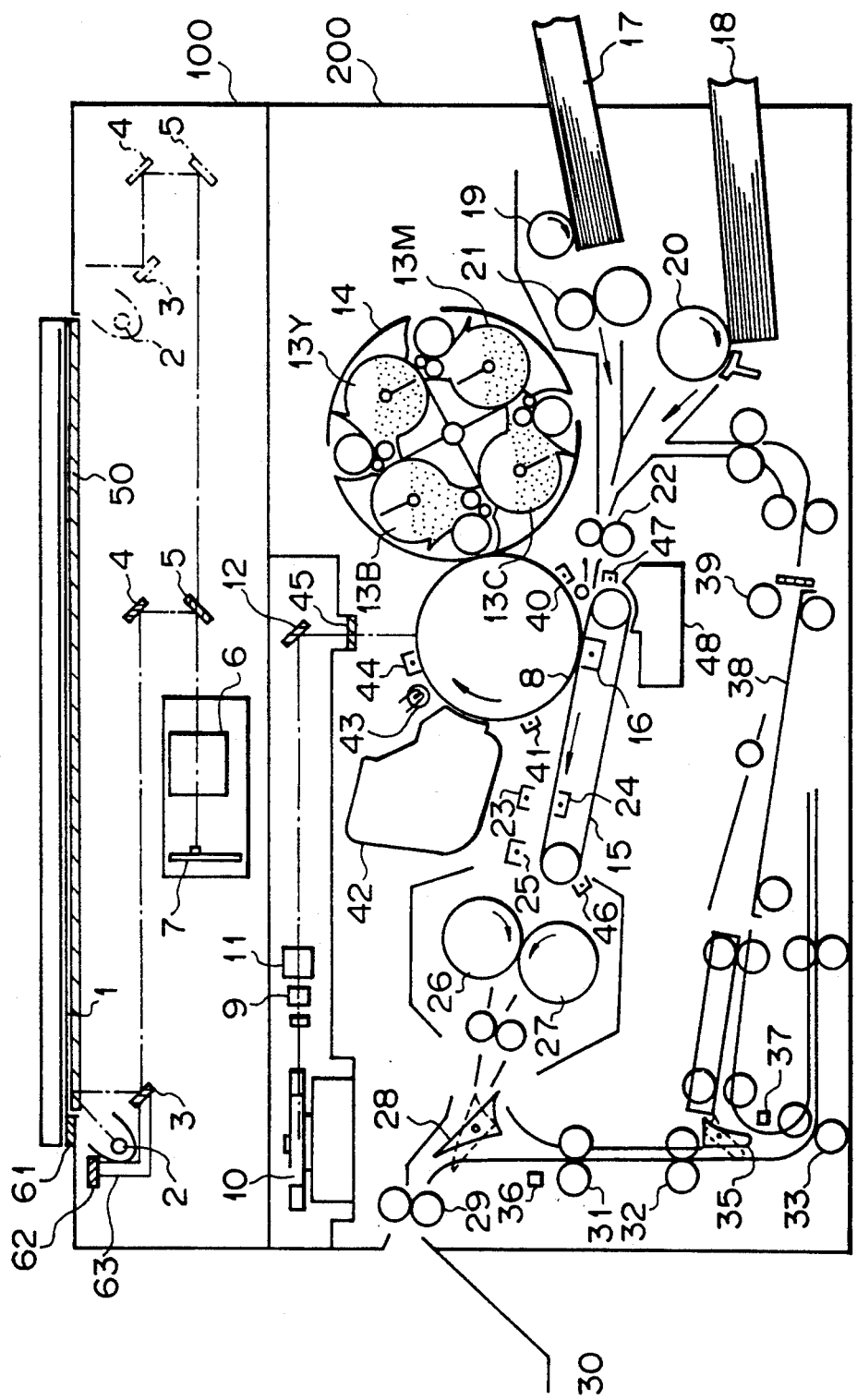
FIG. 1 is a section of a copier to which a first embodiment of the copying area display device in accordance with the present invention is applied.

Referring to FIG. 1 of the drawings, a copier to which a first embodiment of the copying area display device in accordance with the present invention is shown. The copier is implemented as a digital color copier by way of example. As shown, the copier has an image scanner 100 and a printer 200 disposed below the image scanner 100. A transparent glass platen 1 is provided on the top of the image scanner 100 to form an image reading surface. A cover plate 50 is hinged to the image scanner 100 to be movable toward and away from the glass platen 1. The cover plate 50 has a white inner surface which will face the rear of a document. Optics for scanning a document is located below the glass platen 1 and made up of a first carriage 63 loaded with a lamp 2 and a mirror 3, a second carriage loaded with mirrors 4 and 5, and a light receiving unit having a lens 6 and an image sensor 7. The first and second carriages are each mechanically driven in the right-and-left direction as viewed in the figure, i.e., in the subscanning direction. Light emitted from the lamp 2 is reflected by the inner surface of the cover plate 50 and then incident on the image sensor 7 via the mirrors 3, 4 and 5 and lens 6. In the illustrative arrangement, the image sensor 7 has a spectroscope and three monodimensional CCD (Charge Coupled Device) arrays. While the spectroscope separates the incident light into three primary colors, i.e., red (R), green (G) and blue (B), the CCD arrays each senses respective one of R, G and B on a pixel basis.

The image data read by the image scanner 100 is subjected to predetermined image processing and then transferred to the printer 200 to reproduce the document image. In the specific arrangement, the image scanner 100 reads the document four consecutive times during a single copying cycle, so that the printer 200 may sequentially record cyan (C), magenta (M), yellow (Y) and black (BK) to reproduce a full color image. Incorporated in the printer 200 is an image writing unit having a laser 9, a polygonal mirror scanner 10, an f-theta lens 11, a mirror 12, and a dust-proof glass 45. As the laser 9 emits a laser beam modulated by a bilevel signal, i.e., a record/non-record signal on a pixel basis, the polygonal mirror scanner 10 reflects it. Consequently, the laser beam is focused onto the surface of a photoconductive drum 8 via the f-theta lens 11, mirror 12, and dust-proof glass 45.

A cleaning unit 42, a discharge lamp 43, a main charger 44, a developing unit 14, a transfer belt 15, a transfer charger 16 and other conventional process units are arranged around the drum 8. The main charger 44 uniformly charges the surface of the drum 8 to a predetermined high potential. When the laser beam representative of an image is incident on the charged surface of the drum 8, it changes the surface potential of the drum 8. As a result, a potential distribution matching the image, i.e., ON/OFF of the laser beam is formed on the surface of the drum 8. As the potential distribution, i.e., an electrostatic latent image is brought to the developing unit 14, one of four subunits 13C, 13M, 13Y and 13B of the unit 14 deposits a toner of particular color on the drum 8 on the basis of the potential distribution. The toner develops the latent image to produce a corresponding toner image. The toner image is transferred from the drum 8 to the transfer belt 15 by the transfer charger 16. Such a procedure is repeated four times to sequentially form C, M, Y and BK toner images on the transfer belt 15 one above the other. A paper sheet or similar recording medium is fed from a paper cassette 17 or 18 to the transfer belt 1 via a register roller 22. Then, transfer charges 23 and 24 transfer the composite toner image from the transfer belt 15 to the paper sheet. The paper sheet carrying the toner image thereon is separated from the transfer belt 15 by a separation charger 25, transported to a fixing roller 26 to have the toner image fixed, and then driven to a discharge path.

Figure 5:
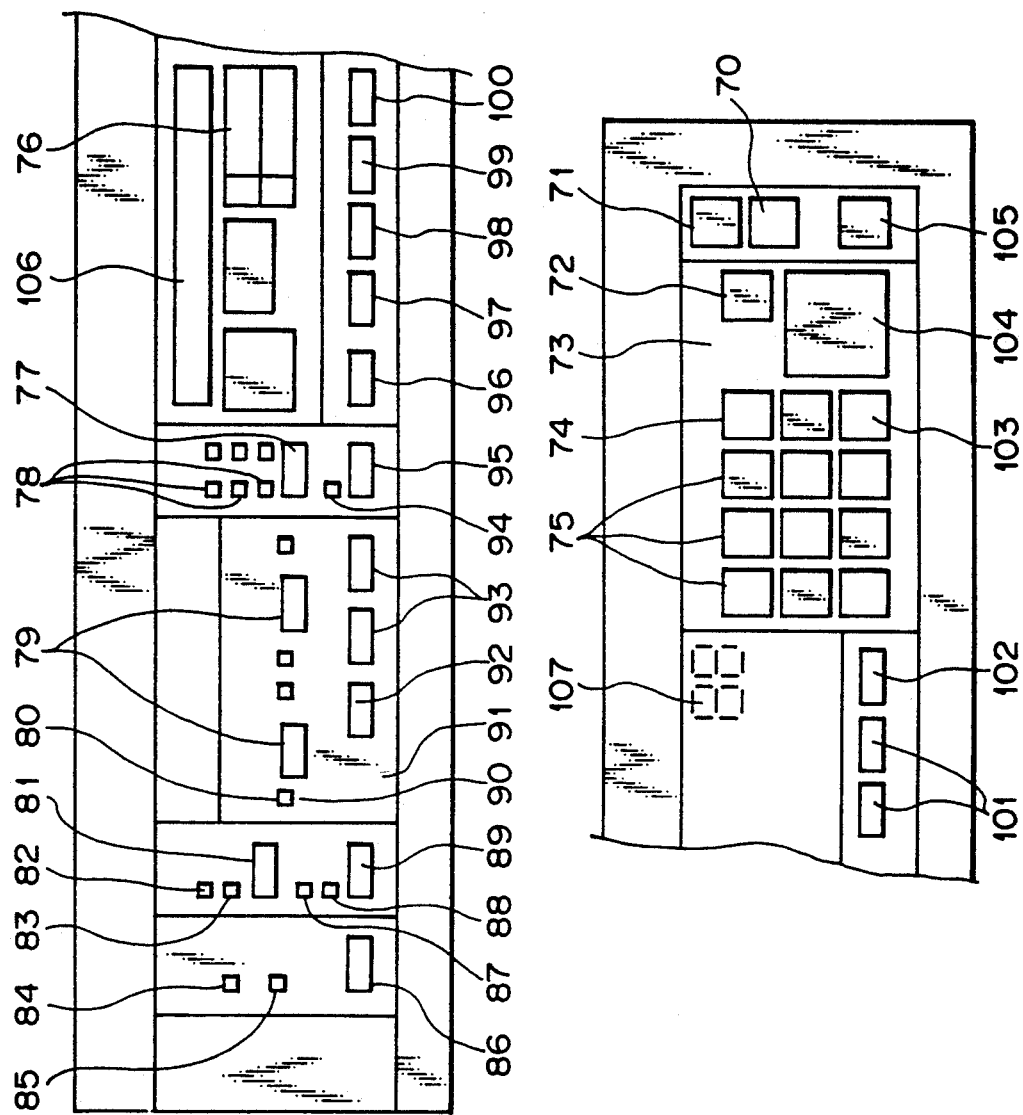
FIG. 5 is a plan view of an operation board included in the copier of FIG. 1.

FIG. 5 shows an operation board mounted on the top of the copier. As shown, a number of key switches and a number of indicators are arranged on the operation board. Typical of the key switches and indicators are an interrupt key 72 for setting or cancelling an interrupt copy mode, an interrupt indicator 73 for indicating an interrupt copy mode, a number acknowledge key 74, numeral keys 75, a display panel 76 for displaying various kinds of information, a two-sided copy mode key 77, two-sided copy indicators 78 for indicating a two-sided copy mode, margin adjust keys 79, a margin indicator 80 for indicating the dimension of a margin, an APS (Automatic Paper Select) mode key 81, an APS indicator 83, an AMS (Automatic Magnification Change) mode key 89, a zoom key 93, a reduce key 97, an enlarge key 98, a x1 key 99, a paper select key 100, a density adjust key 101, an automatic density adjust mode key 102, a clear/stop key 103, a print start key 104, an enter key 105, a message display 106, and a number display 107. These key switches, indicators and displays are conventional and will not be described specifically.

Figure 2:
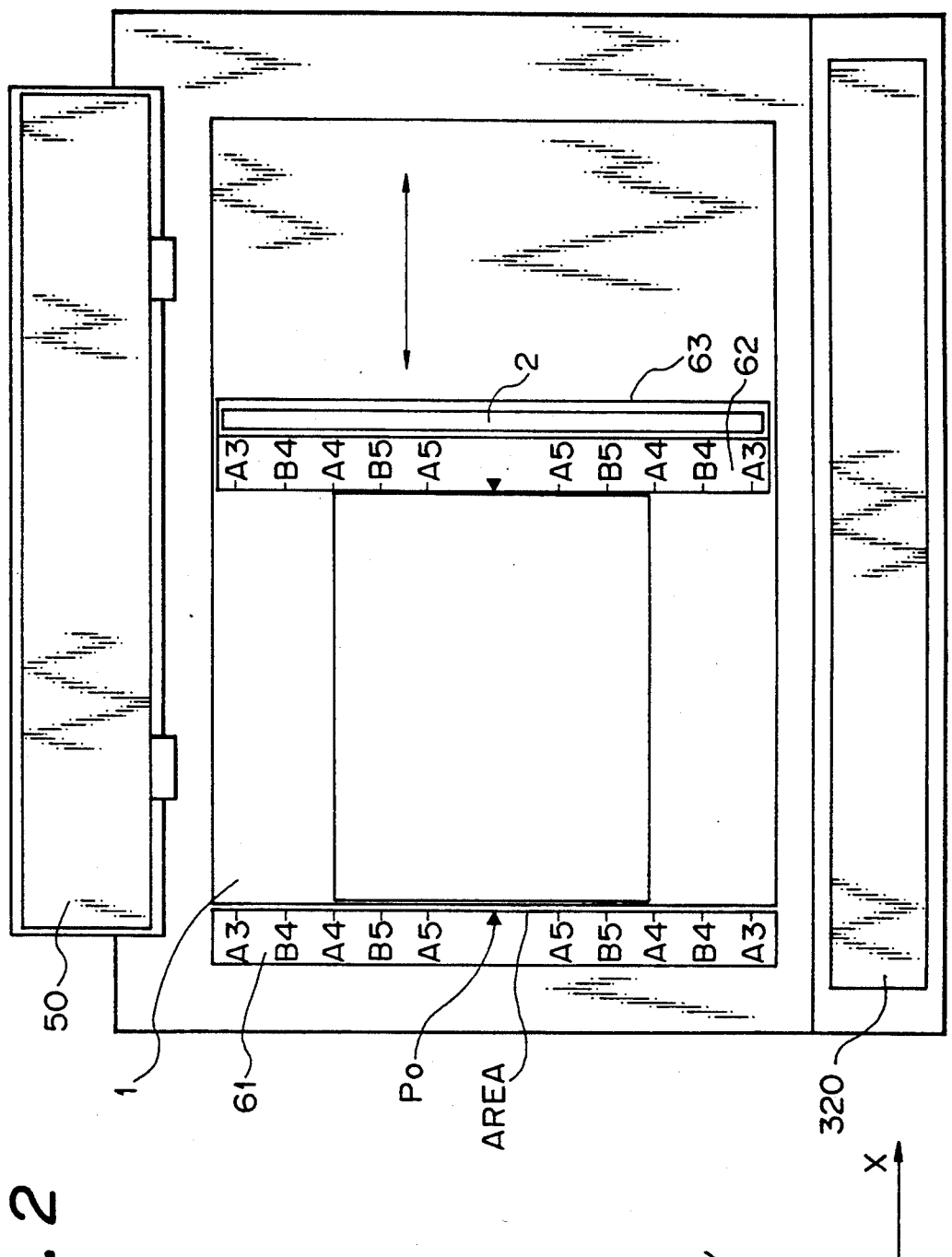
FIG. 2 is a plan view showing the copier of FIG. 1 in a condition wherein a cover plate thereof is opened.

When the cover plate 50, FIG. 1, of the copier is opened away from the glass platen 1, the copier appears as shown in FIG. 2 in a plan view. As shown, a scale 61 is positioned at the left end of the glass platen 1 and extends along the side of the glass platen 1. Another scale 62 is mounted on the first carriage 63 which is disposed below and visible through the glass platen 1. The scales 61 and 62 allow the operator to position a document on the glass platen 1.

Generally, the area over which a document matching the entire image to appear on a paper sheet is read, i.e., the effective image reading area changes with the size of a paper sheet and magnification. Also, the effective image reading area is determined on the basis of a reference point which depends on the machine. In the embodiment shown in FIG. 2, a reference point Po is located at the center of the left side of the rectangle of the glass platen 1. Hence, to position a document of the same size as an effective image reading area AREA on the glass platen 1, the operator positions one side of the document at the left side of the rectangular glass platen 1, i.e., the scale 61. The scales 61 and 62 are each provided with graduations A5, B5, A4, B4 and A3 each coinciding with the corner of a document of particular size. Therefore, only if the operator positions a document such that it adjoins the scale 61 and coincides with the corresponding graduation, the document is brought into coincidence with the effective image reading area AREA. Then, the entire image of the document can be reproduced on a paper sheet.

However, when a document is to be copied in a desired magnification by a zooming function available with the copier, the effective image reading area does not coincide with any one of the regular sizes (A5, B5, A4, B4 and A3). Further, it is sometimes desired to copy a document whose size is not regular. In such a case, it is difficult to bring the desired area of the document into coincidence with the effective image reading area simply by using the scale 61.

Figure 4:
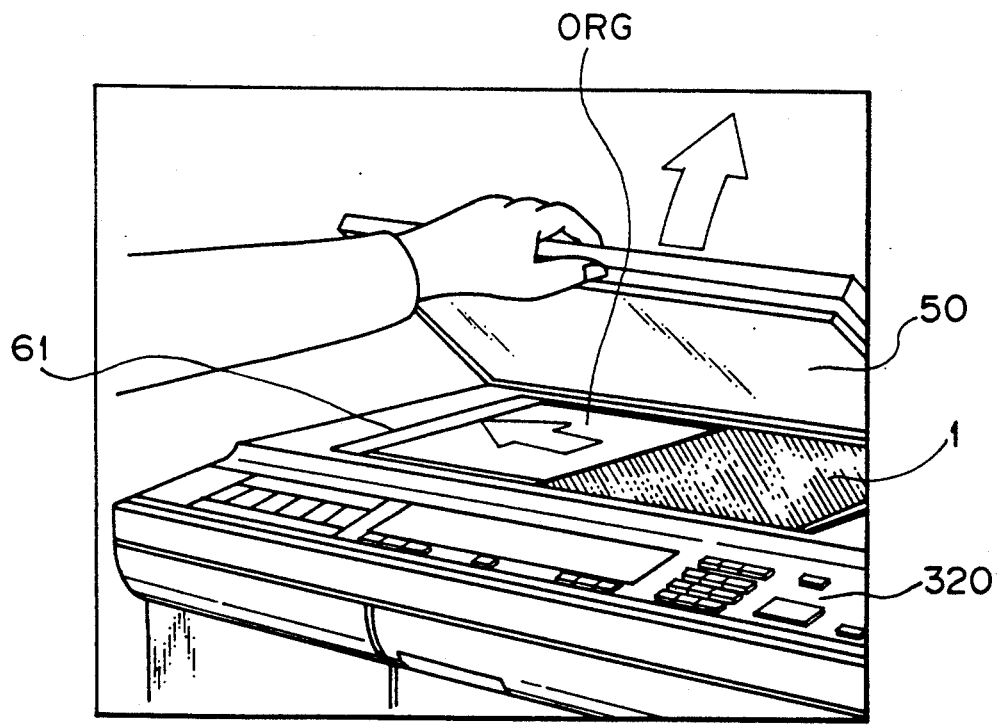
FIG. 4 is a perspective view associated with FIG. 1.

To eliminate the above problem, in the illustrative embodiment, the first carriage 63 is automatically movable to a position matching the effective image reading area, i.e., a position where the scale 62 thereof extends along one side of the effective image reading area. This function is available when the cover plate 50 is opened, as shown in FIG. 4. The operator, therefore, can see the positions of two opposite sides of the effective image reading area AREA on the basis of the positions of the two scales 61 and 62. Further, the operator can see the positions of the other two sides of the area AREA by looking at the graduations of the scales 61 and 62. This allows a document ORG to be readily positioned in the effective image reading area.

Figure 3:
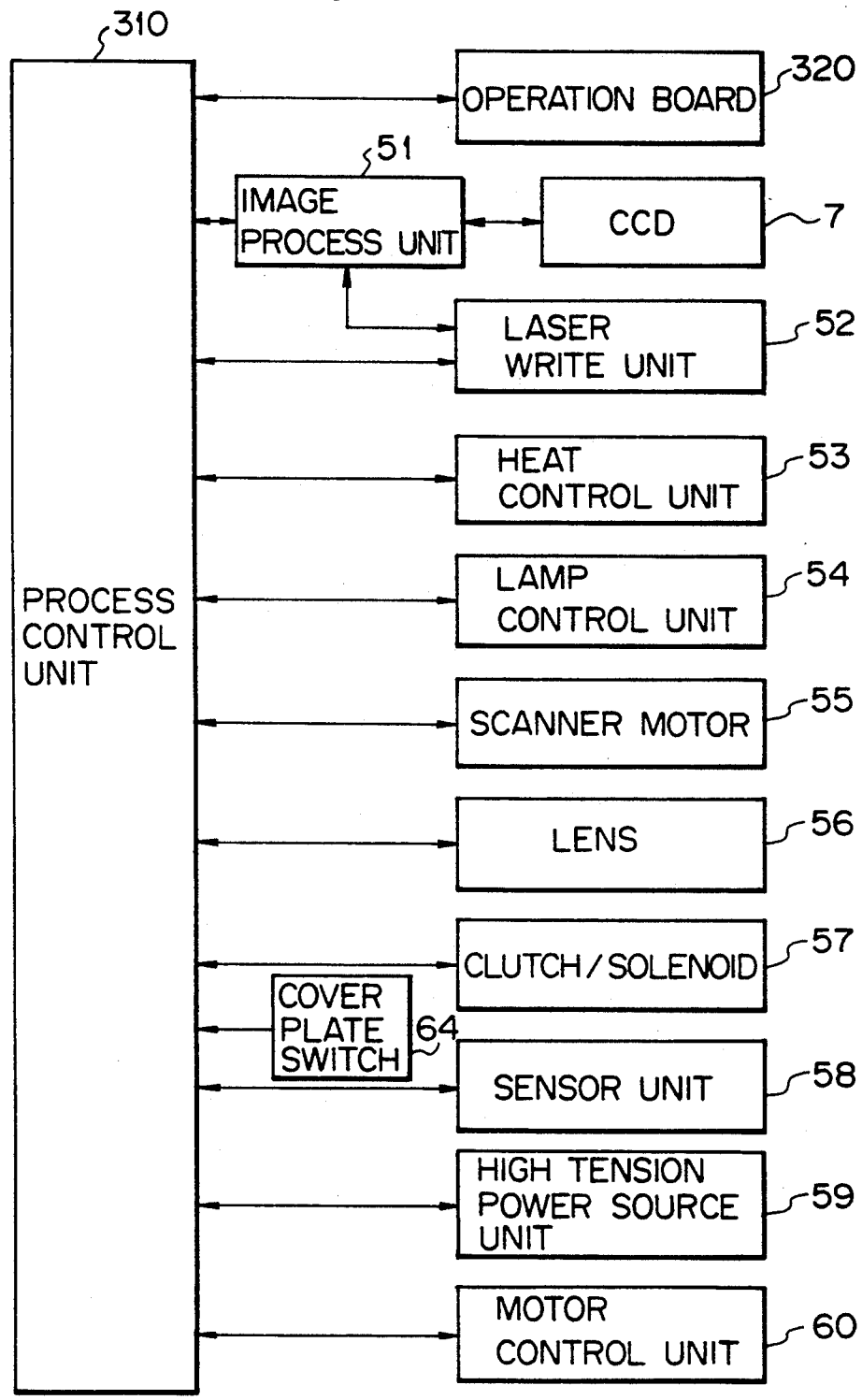
FIG. 3 is a block diagram schematically showing electric circuitry incorporated in the copier of FIG. 1.

Referring to FIG. 3, an electric arrangement incorporated in the copier of FIG. 1 will be described. As shown, a process control unit 310 having a microcomputer controls the entire copier. Various units 320, 51, 52, 53, 54, 55, 56, 57, 58, 59 and 60 are connected to the process control unit 310. Specifically, image data from the image sensor 7 is applied to an image processing unit 51 to undergo predetermined processing. The processed image data is delivered to a laser writing unit 52. A heater control unit 53 maintains the fixing roller 26 at a predetermined temperature by controlling heat to be generated by a heater. A lamp control unit 54 controls the voltage to be applied to the lamp 2 so as to maintain the quantity of light for illuminating a document constant. A scanner motor unit 55 controls an electric motor included in the scanning optics to drive the first and second carriages in the subscanning direction. A lens unit 56 controls an electric motor coupled to the lens 6 to adjust the magnification of the lens 6, i.e., the magnification in the main scanning direction. To change the magnification in the subscanning direction, the drive speed of the scanning optics in the subscanning direction is changed. A clutch/solenoid unit 57 selectively turns on or turns off clutches and solenoids included in a paper feed system, transport system and other drive systems.

A sensor unit 58 includes various sensors each being located at a particular section of the copier. The sensor unit 58 executes various kinds of processing, e.g., amplification and wave shaping with the output signals of the sensors and sends the processed signals to the process control unit 310. The sensors include paper size sensors assigned to the two paper feed systems (17 and 18), a position sensor responsive to the position of the scanning optics, and paper sensors arranged on a paper transport path. The paper size sensors each determines the kind of the paper cassette by identifying the shape of an identification piece, not shown, added to the cassette. Specifically, each paper cassette is loaded with paper sheets of particular size at all times to allow the associated paper size sensor to detect it.

A cover plate switch 64 is implemented by a pressure-sensitive switch, not shown. When the cover plate 50 is raised to the position shown in FIG. 4, the switch 64 turns off. When the cover plate 50 is lowered onto the glass platen 1, as shown in FIG. 1, the switch 64 turns on by being pressed by the cover plate.

Figure 6:
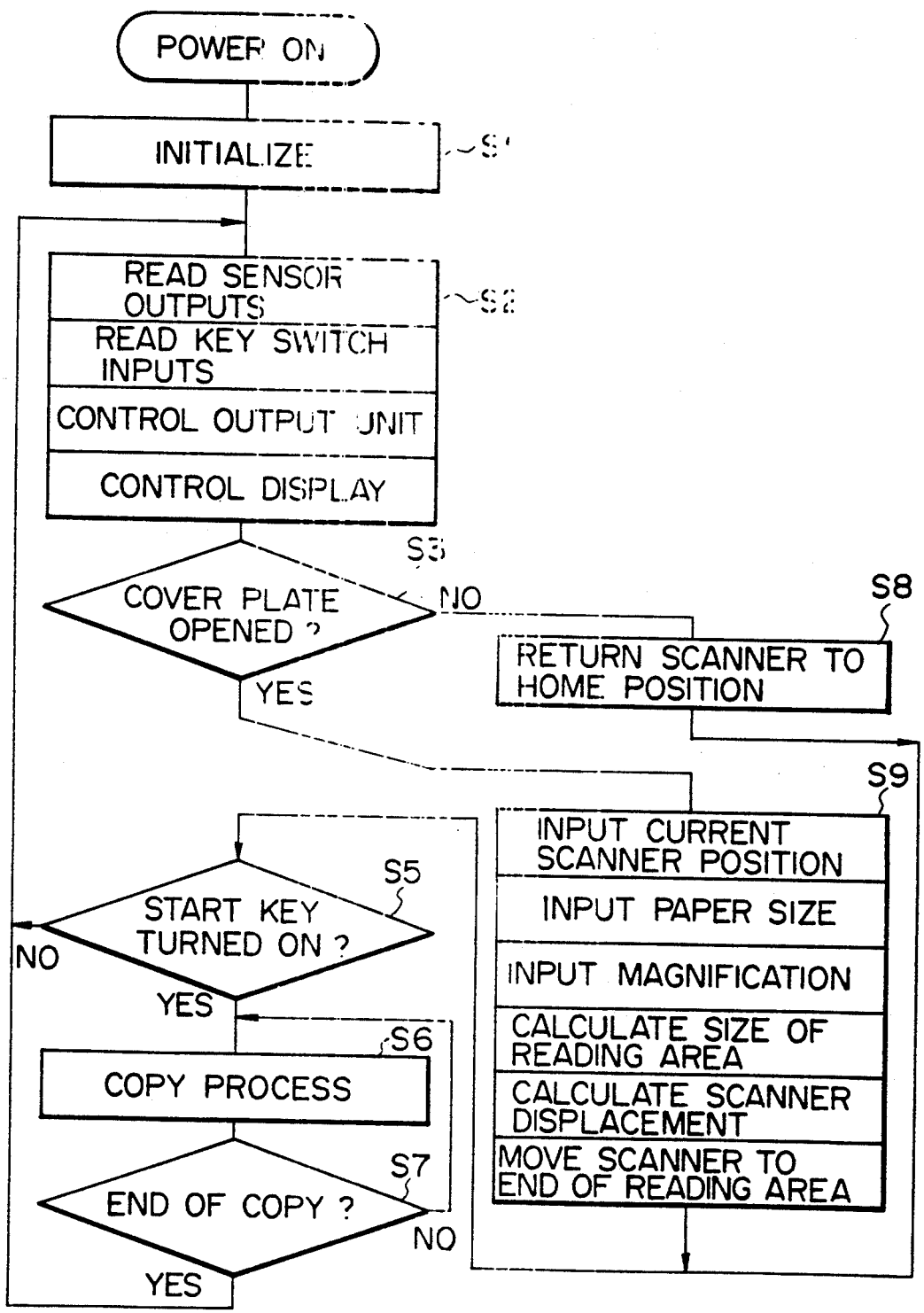
FIG. 6 is a flowchart demonstrating a specific operation of a control unit included in the circuitry of FIG. 3.

FIG. 6 demonstrates a specific procedure to be executed by the process control unit, or simply control unit as referred to hereinafter, 310. As shown, when a power source is turned on, the control unit 310 initializes itself (clearing a RAM, setting various modes, setting an output port state, etc.) and then initializes the copier (setting copy modes, setting timers, etc.) (step S1). Subsequently, the control unit 310 executes wait mode processing (S2). In the wait mode processing, the control unit 310 reads the output signals of various sensors as well as the states of the key switches of the operation board, ON/OFF controls various output units, executes error checking, executes decisions with the read signals, and executes timer processing and display processing. The wait mode processing is repeated until the copier becomes ready to operate.

When the cover plate switch 64 detects the opening of the cover plate 50 while the copier is in the waiting state (YES, S3), the control unit 310 inputs the current position of the scanner (first carriage 63), inputs the size of paper sheets stacked in the paper feed system selected, and then inputs the current magnification. Subsequently, the control unit 310 calculates the size SIZE of the effective image reading area as measured in the subscanning direction (X direction). To determine the size SIZE, the control unit 310 divides the paper size by the magnification. Further, the control unit 310 determines a distance which the scanner should move from the current position to a target position (where the distance from the reference point Po in the X direction coincides with SIZE) on the basis of SIZE and current position of the scanner. Then, the control unit 310 moves the scanner the determined distance. As a result, the scale 62 of the scanner is brought to a position where it coincides with the right end of the effective image reading area, as shown in FIG. 2.

Assuming that the magnification available with the copier is constant (100%), then the size SIZE of the effective image reading area coincides with the paper size. Therefore, SIZE can be determined on the basis of the size of paper sheets stacked in the paper feed system selected.

As the operator having positioned the document closes the cover plate 50, the cover plate switch 64 detects the closing. Then, the control unit 310 returns the scanner (first and second carriages) to a home position indicated by solid lines in FIG. 1 (S8). Specifically, since the scanner starts reading a document at a position close to the home position, the scanner is returned to the home position beforehand so as to reduce the waiting time up to the start of a copying operation.

It is noteworthy that the embodiment ends the operation while holding the scanner at a position where the forward scanning has ended (right end of the effective image reading area). Hence, the displacement of the scanner in the step S9 is relatively small, allowing the scanner to be positioned in a short period of time.

The print start key 104 of the operation board is pressed after the copier has become ready to operate (YES, S5). Then, the control unit 310 executes a copying process (S6). Specifically, the control unit 310 drives the motor coupled to the lens 6 to adjust the magnification of the lens 6, thereby setting up a desired magnification. At the same time, the control unit 310 cleans the surface of the photoconductive drum and, when a desired number of copies is entered on the numeral keys, stores it in a copy number register. This is followed by the previously stated copying cycle, i.e., the steps of uniformly charging the photoconductive drum to a high potential, scanning the charged drum by a reflection from a document to form a latent image, developing the latent image, transferring the resulting toner image to a paper sheet, separating the paper sheet from the drum, transporting the paper sheet to the fixing unit, and then driving it out of the copier. The copy mode processing is repeated until a single copying cycle completes. On the completion of a single copying cycle, the control unit 310 increments a copy counter by 1 and then compares the content of the counter with that of the copy number register. If the two contents do not compare equal, the control unit 310 repeats the copy mode processing so as to executes the copying cycle a plurality of times substantially continuously. When the copying cycle is repeated a number of times corresponding to the content of the copy number register, the control unit 310 clears the copy counter and executes various kinds of processing, e.g., paper transport processing, error checking, and postcopy processing. The control unit 310 repeats the copy mode processing until all the paper sheets have been driven out of the copier. Subsequently, the program returns to the step S2. The above procedure is repeated every time copy start conditions are satisfied.

Figure 7:
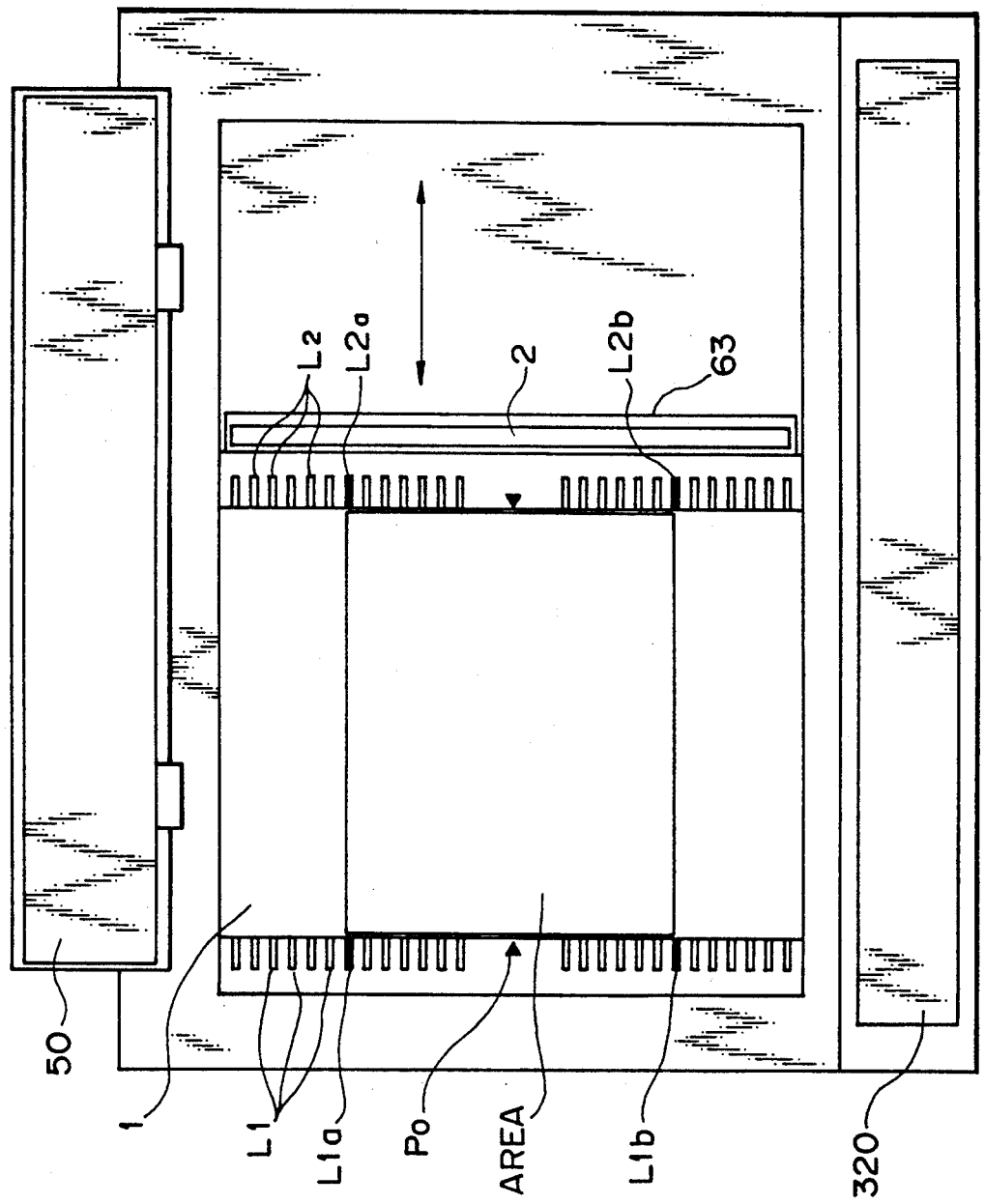
FIG. 7 is a plan view of a copier representative of a second embodiment of the present invention.

Referring to FIG. 7, a second embodiment of the present invention is shown. As shown, a number of display elements (light emitting diodes or LEDs) L1 are arranged in a vertical array along the left end of the glass platen 1 in place of the scale 61 of the first embodiment. Also, a number of display elements L2 are arranged in a vertical array on the first carriage 63 in place of the scale 62. The rest of the construction is identical with the first embodiment.

Figure 8:
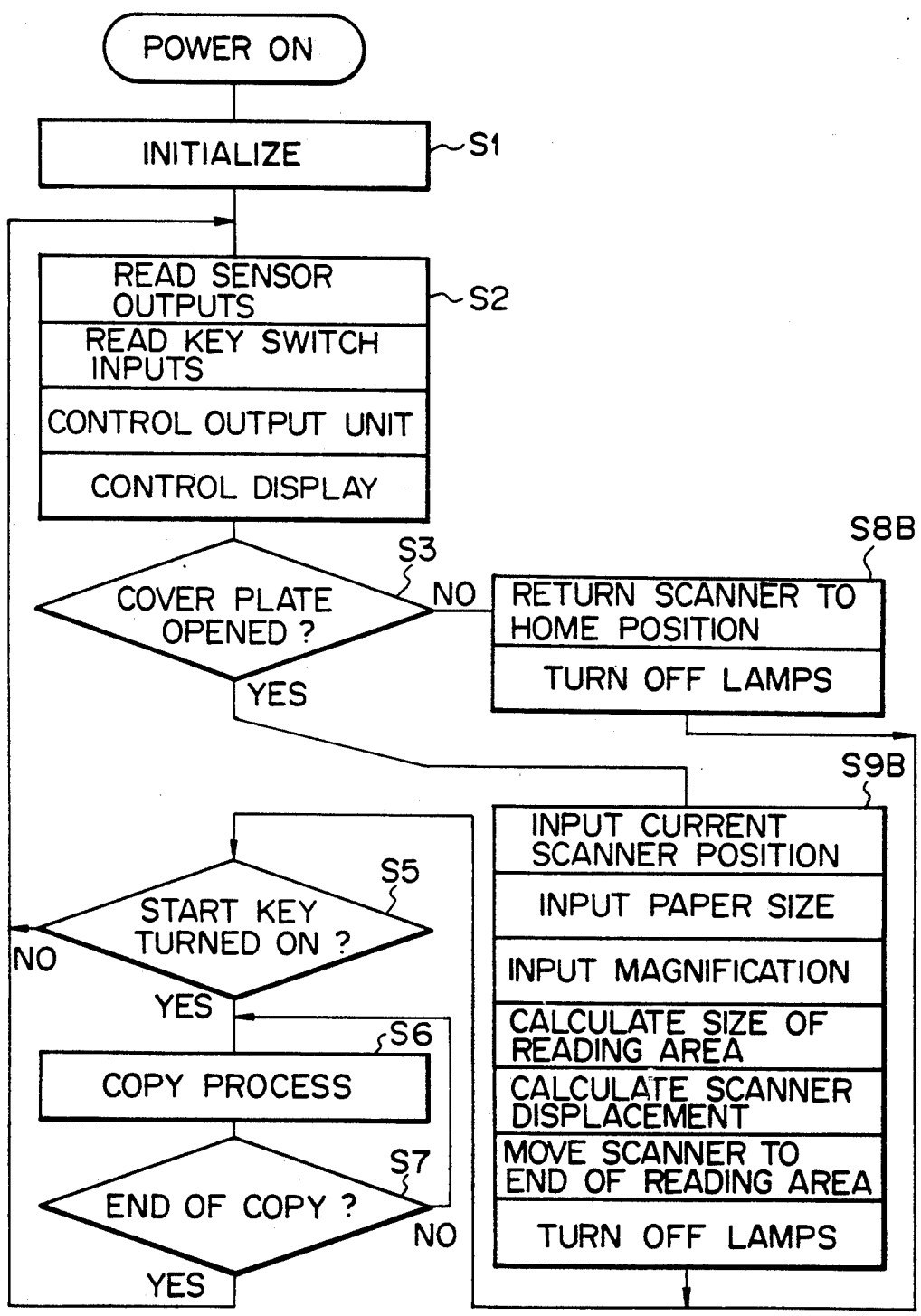
FIG. 8 is a flowchart representative of a specific operation of the control unit particular to the second embodiment.

FIG. 8 demonstrates a specific sequence to be executed by the control unit 310 in this embodiment and which is similar to the sequence of FIG. 6 except for the following. As shown, in a step S9B which is a substitute for the step S9 of FIG. 6, the control unit 310 turns on particular ones of the display elements L1 and L2 which are spaced apart from the reference point Po in the vertical direction by one half of the width (vertical size) of the effective image reading area determined by calculation. In the specific condition shown in FIG. 7, display elements L1a, L1b, L2a and L2b are turned on. The first carriage 63 is positioned at the right side of the effective image reading area AREA, as in the previous embodiment. Hence, the four corners of the rectangle of the area AREA coincide with the display elements L1a, L1b, L2a and L2b, respectively. This allows the operator to see the effective image reading area AREA by looking at the display elements L1a, L1b, L2a and L2b turned on. In a step S8B which is a substitute for the step S8 of FIG. 6, the control unit 310 returns the scanner to the home position and turns off the lamps L1a, L1b, L2a and L2b.

Figure 9:
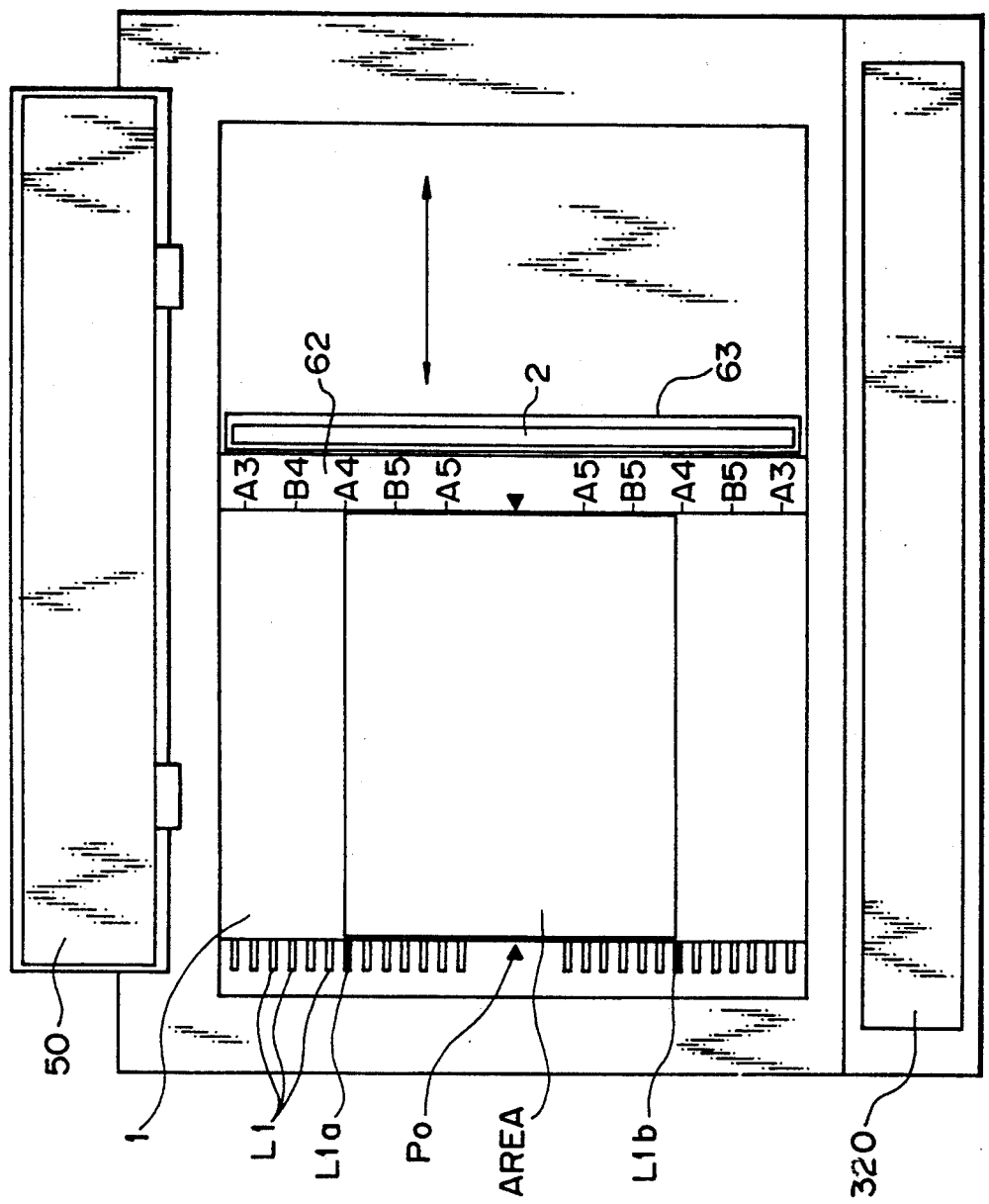
FIG. 9 is a plan view of a copier representative of a third embodiment of the present invention.

FIG. 9 shows a third embodiment of the present invention. As shown, the first carriage 63 is loaded with the scale 62, as in the first embodiment. A number of display elements L1 are arranged along the left end of the glass platen 1, as in the second embodiment. The operation of the process control unit 310 is identical with the operation shown in FIG. 8, except that a single array of display elements (L1) are used.

Figure 10:
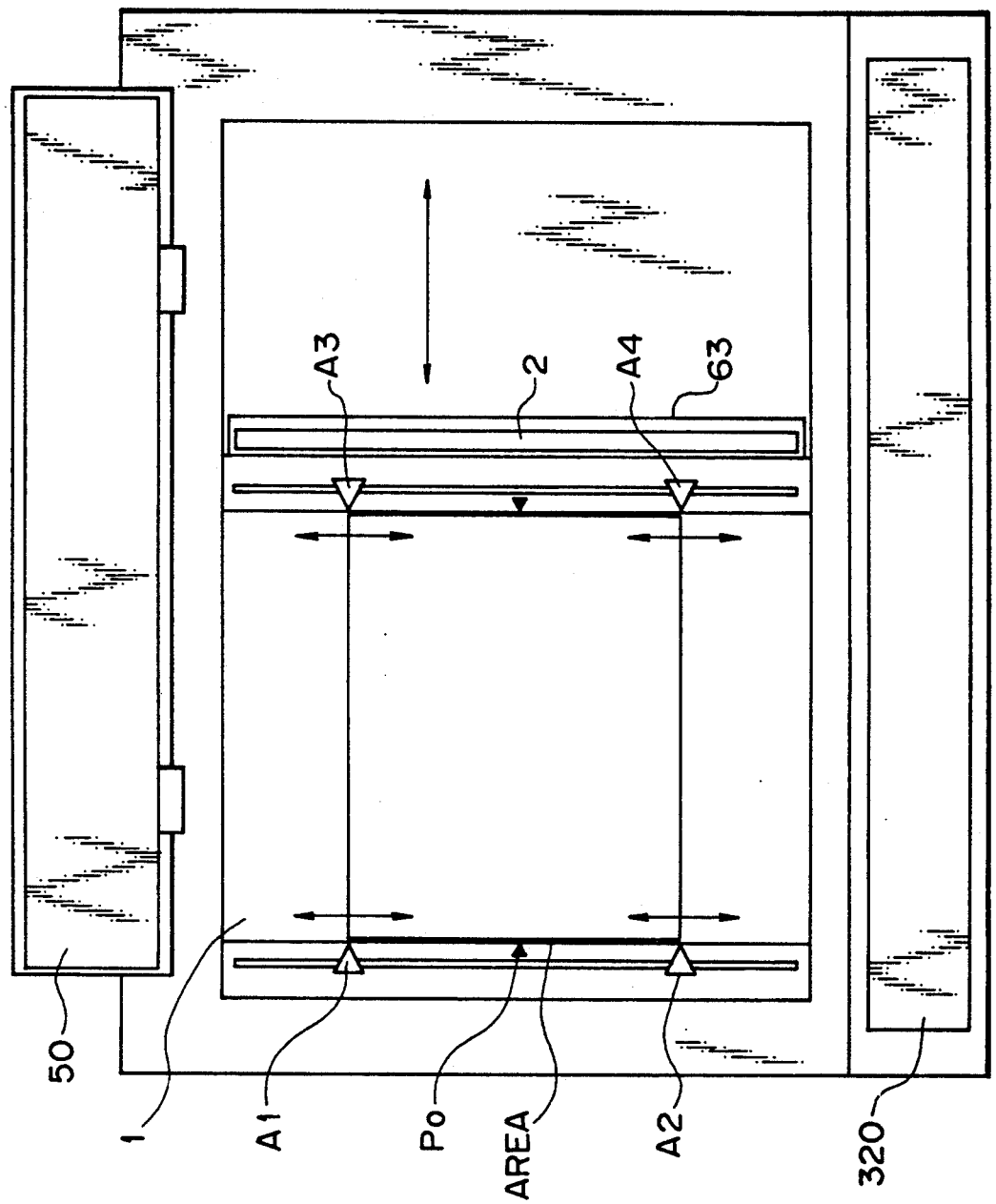
FIG. 10 is a plan view representative of a fourth embodiment of the present invention.
Figure 12:
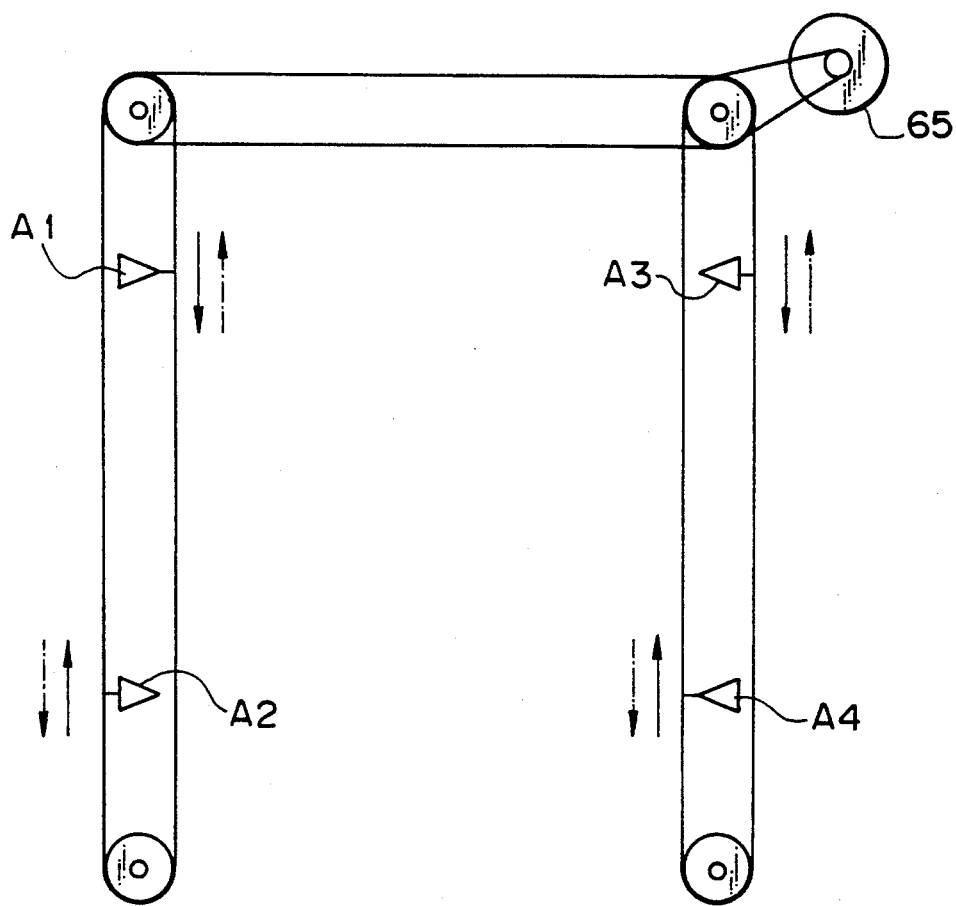
FIG. 12 is a block diagram schematically showing an arrangement for driving movable marks included in the fourth embodiment.

A fourth embodiment of the present invention will be described with reference to FIG. 10. As shown, movable marks A1 and A2 are arranged along the left end of the glass platen 1 in place of the scale 61 of the first embodiment. Likewise, movable marks A3 and A4 are mounted on the first carriage 63 in place of the scale 62 of the first embodiment. The marks A1-A4 are movable in the vertical direction as viewed in FIG. 10. As shown in FIG. 12, the marks A1-A4 are operatively connected to a motor 65 by belts. The marks A1 and A2 are movable toward and away from each other, as indicated by arrows in FIG. 10. Likewise, the marks A3 and A4 are movable toward and away from each other. Specifically, since the reference point Po is located at the center of the glass platen 1, the four marks A1-A4 are moved such that the distances thereof from the reference point Po in the vertical direction are identical at all times. The rest of the construction is the same as the previous embodiments.

Figure 11:
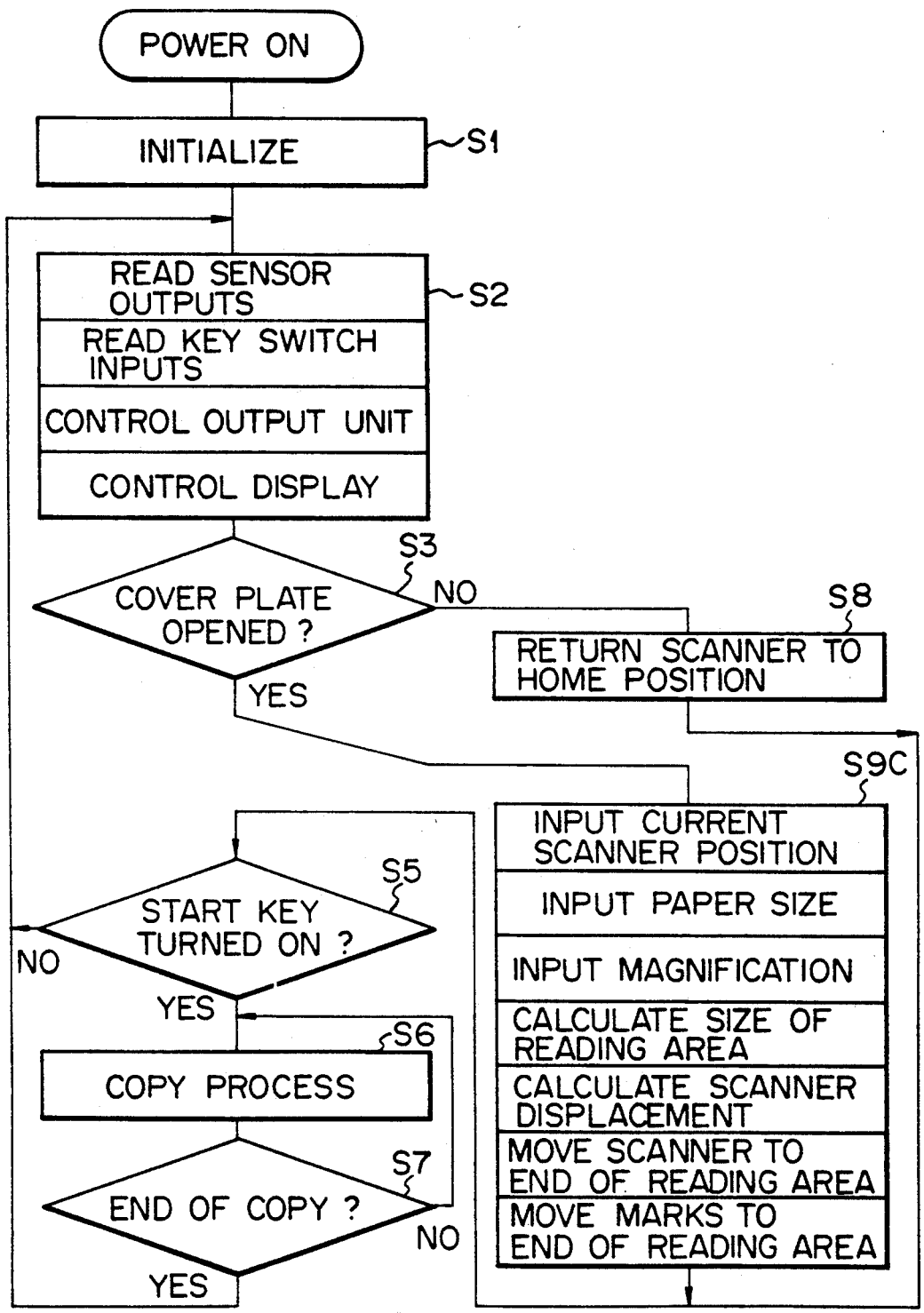
FIG. 11 is a flowchart demonstrating a specific operation of the control unit particular to the fourth embodiment.

FIG. 11 shows a specific procedure to be executed by the control unit 310 in this embodiment and which is identical with the procedure of FIG. 6 except for the following. As shown, in a step S9C which is a substitute for the step S9 of FIG. 6, the control unit 310 controls the motor 65 such that the marks A1-A4 are each moved to a position spaced apart from the reference point Po in the vertical direction a distance which is one half of the width (vertical size) of the effective image reading area AREA determined by calculation. As in the previous embodiment, since the first carriage 63 is brought into coincidence with the right side of the area AREA, the four corners of the rectangular AREA coincide with the marks A1-A4, respectively. The operator, therefore, can see the effective image reading area AREA on the basis of the positions of the marks A1-A4.

Figure 13:
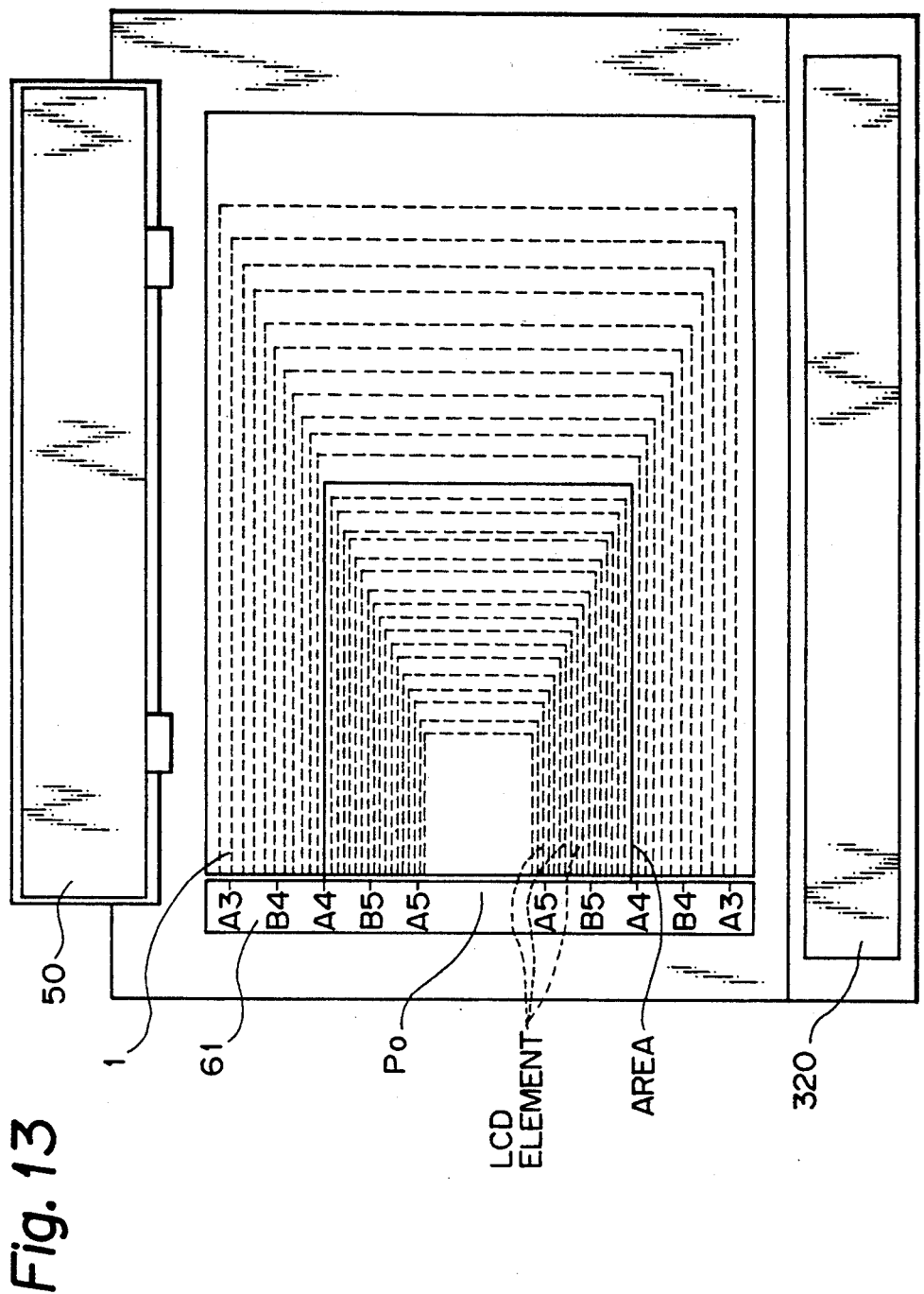
FIG. 13 is a plan view representative of a fifth embodiment of the present invention.

A fifth embodiment of the present invention will be described with reference to FIG. 13. As shown, a transparent liquid crystal display (LCD) is built in the glass platen 1. The LCD is provided with a number of rectangular patterns, or display elements, of different sizes, as indicated by dotted lines in the figure. The rectangular patterns are each located at a position matching a particular size and a particular position which the effective image reading area may assume. When one of such display elements is turned on, a rectangular frame is displayed at a position matching the contour of the effective image reading area AREA, as shown in FIG. 13 specifically.

Figure 14:
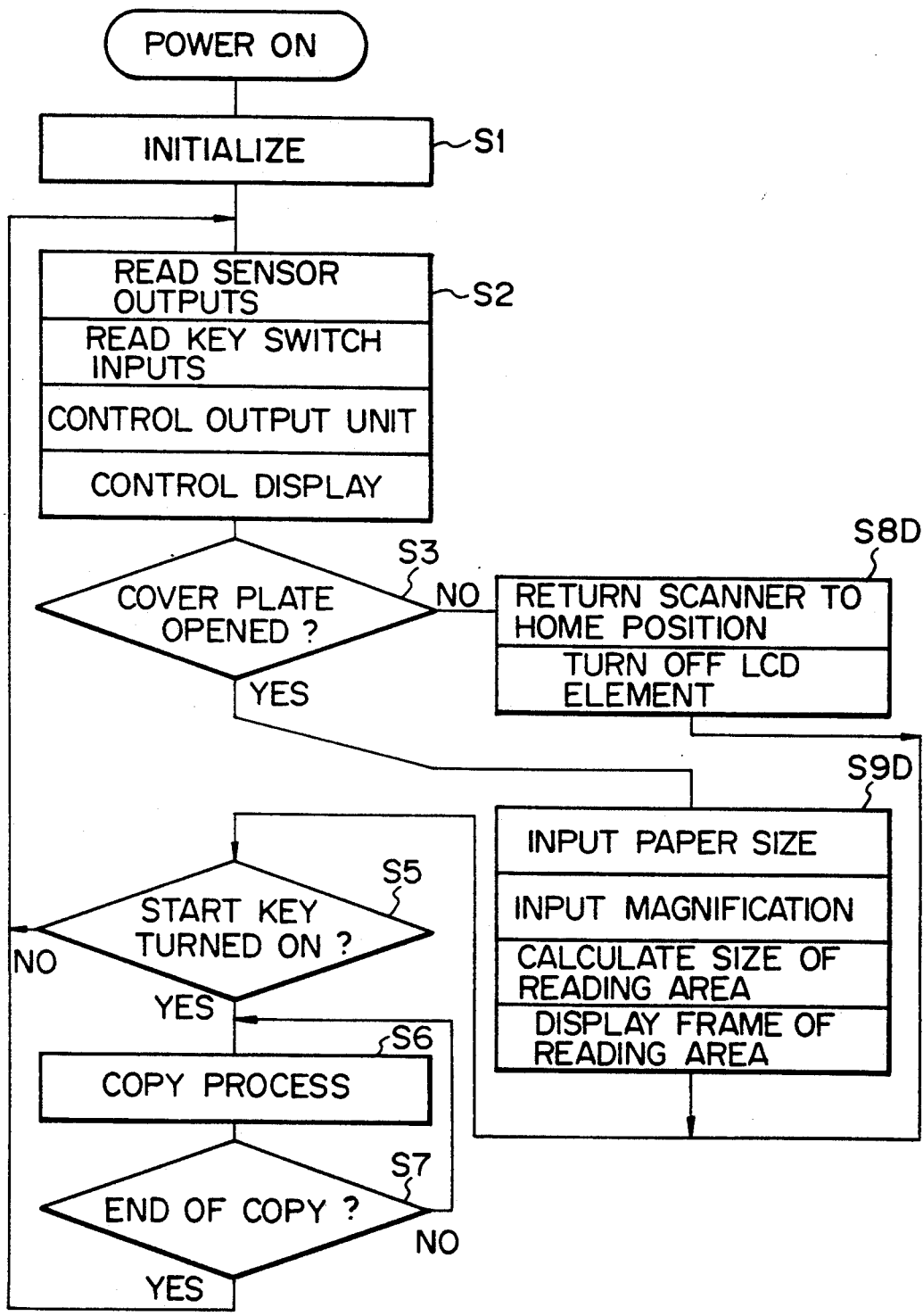
FIG. 14 is a flowchart demonstrating a specific operation of the fifth embodiment.

FIG. 14 shows a specific procedure to be executed by the control unit 310 in this embodiment and which is identical with the procedure of FIG. 6 except for the following. As shown, in a step S9D which is a substitute for the step S9 of FIG. 6, the control unit 310 inputs a paper size selected, inputs the current magnification, and then calculates the size SIZE of the effective image reading area. Subsequently, the control unit 310 determines the effective image reading area AREA on the basis of SIZE and then turns on the display element matching AREA, thereby displaying a frame representative of AREA. The operator, therefore, can see the effective reading area AREA by looking at the frame appearing on the glass platen 1. In a step S8D which is a substitute for the step S8 of FIG. 6, the control unit 310 returns the scanner to the home position and then turns off the display element or frame.

Figure 15:
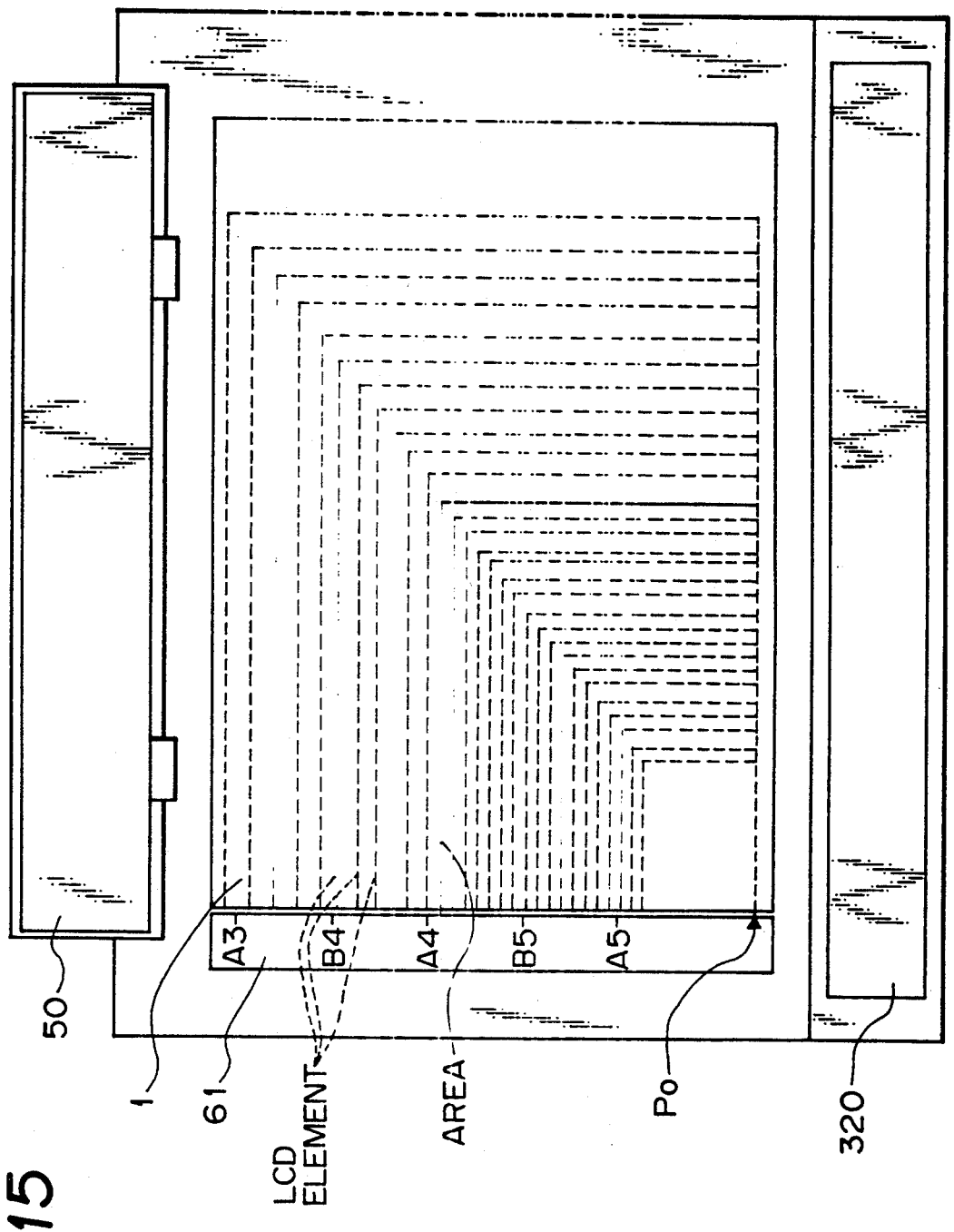
FIG. 15 is a plan view of a copier representative of a sixth embodiment of the present invention.

FIG. 15 shows a modified form of the fifth embodiment. While the fifth embodiment locates the reference point Po at the center of the glass platen 1, the modified embodiment locates it at the lower left corner of the glass platen 1. The display elements of the LCD are rearranged accordingly, as illustrated.

In summary, it will be seen that the present invention provides a display device which allows the operator to readily see a position where a document should be located to produce an attractive copy, thereby enhancing easy operation of a copier. Particularly, even when a desired magnification is entered and the size and position of an effective image reading area differ from those of a regular size (A3, B4, A4, etc.), the operator can accurately recognize the effective image reading area by looking at marks provided on or around a glass platen. In addition, since a scanner is returned to a home position in response to the closing of a cover plate, the waiting time up to the start of a copying operation is reduced.

Various modifications will become possible for those skilled in the art after receiving the teachings of the present disclosure without departing from the scope thereof.

What is claimed is:

1. A copying area display device for a copier having a transparent glass platen on which a document is to be laid, image reading means disposed below said glass platen and physically movable along a first axis, an openable cover plate for covering a rear of a document laid on said glass platen when closed, copying means for reproducing an image of said document read by said image reading means, and an operating section accessible for entering at least a desired magnification, said device comprising:
   a first scale located at, among four sides of the glass platen, a side perpendicular to the first axis and coincident with a reference position of an effective image reading area, and a second scale provided on a movable body of the image reading means, said first scale and said second scale extending parallel to a second axis perpendicular to said first axis;
   sensing means for sensing an open/closed position of the cover plate; and
   control means for determining, when said sensing means senses an open position of the cover plate, a position of an effective image reading area on the basis of a size of a recording medium to be used and positioning the movable body of the image reading means such that said movable body coincides with one side of said effective image reading area.

2. A device as claimed in claim 1, wherein when said sensing means senses an open position of the cover plate, said control means determines a position of an effective image reading area on the basis of the size of the recording medium to be used and a current magnification and positions the movable body of the image reading means such that said movable body coincides with one side of said effective image reading area.

3. A device as claimed in claim 1, wherein if the movable body of the image reading mean is not located at a predetermined home position when said sensing means senses a closed position of the cover plate, said control means moves said movable body to a position close to a position for starting reading an image.

4. A copying area display device for a copier having a transparent glass platen on which a document is to be laid, image reading means disposed below said glass platen and physically movable along a first axis, an openable cover plate for covering a rear of a document laid on said glass platen when closed, copying means for reproducing an image of said document read by said image reading means, and an operating section accessible for entering at least a desired magnification, said device comprising:
   a plurality of display element means provided on at least either of, among four sides of the glass platen, a side perpendicular to the first axis and coincident with a reference position of an effective image reading area and a movable body of the image reading means, said plurality of display element means being indicative of a position in a direction of a second axis perpendicular to said first axis;
   sensing means for sensing an open/closed position of the cover plate; and
   control means for determining, when said sensing means senses an open position of the cover plate, a position of an effective image reading area on the basis of a size of a recording medium to be used, positioning the movable body of the image reading means such that said movable body coincides with one side of said effective image reading area, and controlling said plurality of display element means to display said position of said effective image reading area.

5. A device as claimed in claim 4, wherein when said sensing means senses an open position of the cover plate, said control means determines a position of an effective image reading area on the basis of the size of the recording medium to be used and a current magnification, positions the movable body of the image reading means such that said movable body coincides with one side of said effective image reading area, and controls said plurality of display element means to display said position of said effective image reading area.

6. A device as claimed in claim 4, wherein if the movable body of the image reading means is not located at a predetermined home position when said sensing means senses a closed position of the cover plate, said control means moves said movable body to a position close to a position for starting reading an image.

7. A copying area display device for a copier having a transparent glass platen on which a document is to be laid, image reading means disposed below said glass platen and physically movable along a first axis, an openable cover plate for covering a rear of a document laid on said glass platen when closed, copying means for reproducing an image of said document read by said image reading means, and an operating section accessible for entering at least a desired magnification, said device comprising:

movable mark means provided on at least either of, among four sides of the glass platen, a side perpendicular to the first axis and coincident with a reference position of an effective image reading area and a movable body of the image reading means and physically movable in a direction of a second axis perpendicular to said first axis;

driving means for driving said movable mark means;

sensing means for sensing an open/closed position of the cover plate; and control means for determining, when said sensing means senses an open position of the cover plate, a position of an effective image reading area on the basis of a size of a recording medium to be used, positioning the movable body of the image reading means such that said movable body coincides with one side of said effective image reading area, and causing said driving means to move said movable mark means to a position indicative of said effective image reading area.

8. A device as claimed in claim 7, wherein when said sensing means senses an open position of the cover plate, said control means determines a position of an effective image reading area on the basis of the size of the recording medium to be used and a current magnification, positions the movable body of the image reading means such that said movable body coincides with one side of said effective image reading area, and moves said movable mark means to a position indicative of said effective image reading area.

9. A device as claimed in claim 7, wherein if the movable body of the image reading means is not located at a predetermined home position when said sensing means senses a closed state of the cover plate, said control means moves said movable body to a position close to a position for starting reading an image.

10. A copying area display device for a copier having a transparent glass platen on which a document is to be laid, an openable cover plate for covering a rear of a document laid on said glass platen when closed, copying means for reproducing an image of a document, and an operating section accessible for entering at least a desired magnification, said device comprising:

liquid crystal display means built in or superposed on said glass platen;

sensing means for sensing an open/closed position of the cover plate; and control means for determining, when said sensing means senses an open position of the cover plate, a position of an effective image reading area on the basis of a size of a recording medium to be used and causing said liquid crystal display means to display said position of said effective image reading area.

11. A device as claimed in claim 10, wherein when said sensing means senses an open position of the cover plate, said control means determines a position of an effective image reading area on the basis of the size of the recording medium to be used and a current magnification and causes said liquid crystal display means to display said position of said effective image reading area.

12. A device as claimed in claim 10, wherein when said sensing means senses a closed position of the cover plate, said control means turns off said liquid crystal display means.

* * * * *